United States Patent [19]

Pip et al.

[11] 4,205,111

[45] May 27, 1980

[54] LAMINATES COMPRISING A FOAMED POLYIMIDE LAYER

[75] Inventors: Wolfgang Pip, Darmstadt; Klaus Winter, Seeheim, both of Fed. Rep. of Germany

[73] Assignee: Röhm GmbH, Darmstadt, Fed. Rep. of Germany

[21] Appl. No.: 966,129

[22] Filed: Dec. 4, 1978

[30] Foreign Application Priority Data

May 26, 1978 [DE] Fed. Rep. of Germany ....... 2822884
May 26, 1978 [DE] Fed. Rep. of Germany ....... 2822885

[51] Int. Cl.$^2$ .................. B32B 5/28; B32B 15/08; B32B 27/08; B32B 27/12
[52] U.S. Cl. .................. 428/215; 156/220; 156/330; 156/332; 428/313; 428/315; 428/322; 428/473
[58] Field of Search .............. 428/473.5, 215, 313, 428/315, 322; 156/220, 330, 332

[56] References Cited

U.S. PATENT DOCUMENTS

| 3,627,711 | 12/1971 | Schroeder | 521/149 |
| 3,673,129 | 6/1972 | Segane et al. | 521/149 |
| 3,708,444 | 1/1973 | Ganzler et al. | 521/88 |
| 3,734,870 | 5/1973 | Schroeder | 521/149 |
| 4,139,685 | 2/1979 | Schroeder | 521/89 |

FOREIGN PATENT DOCUMENTS

2027211 9/1970 France .
1045229 10/1966 United Kingdom .
1078425 8/1967 United Kingdom .

*Primary Examiner*—J. C. Cannon
*Attorney, Agent, or Firm*—Curtis, Morris & Safford

[57] ABSTRACT

Laminates comprising at least one reinforcing layer, for example of metal or of fiber-reinforced duroplast resin, bonded to a foamed polyimide layer are disclosed, wherein the particular nature of the polyimide foam imparts high temperature strength properties to the laminates and permits them to be made by methods, also disclosed, employing more extreme conditions of temperature, pressure, and time than are otherwise operable for making conventional laminates.

14 Claims, No Drawings

LAMINATES COMPRISING A FOAMED POLYIMIDE LAYER

The present invention relates to laminates comprising at least one layer of a foamed polyimide resin and at least one reinforcing layer bonded thereto, and to methods for making such laminates.

Foams of imide polymers are known as technical products and are described, for example, in British Pat. Nos. 1,078,425 and 1,045,229 and in German Pat. No. 1,817,156. They are prepared from polymers of acrylic acid or methacrylic acid, or from copolymers of these acids with the nitriles or amides of the acids, which polymers or copolymers contain a blowing agent, at foaming temperatures from 170° C. to 250° C. At higher temperatures within this region, foams of relatively small density and small strength are obtained. Foams having the higher densities which are particularly suitable for the preparation of laminates can only be formed at temperatures of 170° C. to 190° C., at which temperatures the conversion of the polymer into a polyimide remains incomplete. As blowing agents, itaconic acid, maleic acid anhydride, citric acid, trichloroacetic acid, urea, dimethyl urea, thiourea, dicyandiamide, chloral hydrate, formamide, and formic acid can be mentioned. The foams obtained in this way are, to be sure, characterized by a resistance to deformation by heat, which, in many cases, extends up to 200° C. However, they cannot be constantly exposed to such temperatures, particularly if they are mechanically loaded. A permanent loading capacity depends on the magnitude of the applied forces, the density of the foam, and the temperature. For imide foams in the density region from 50 to 100 kg/m$^3$, temperatures of 100°–120° C. are in many cases an upper limit for continuous stress under mechanical loading. This limit applies also to laminates which, for example, are made from a core layer of the imide foam and layers of glass fiber-reinforced synthetic resin laminated to both sides thereof. A permanent loading capacity for such laminates at higher temperatures is often desired. For example, for numerous uses in the construction of aircraft, a thermal stability up to 155° C. is required.

The object of the present invention are laminates having an essentially higher thermal stability. Under loading conditions under which laminates prepared in the usual fashion from known imide foams with, for example, fiber-reinforced synthetic resin outer layers endure continuous loading only at 100° C.–120° C., the laminates according to the present invention can still be employed at temperatures in the region from 120° C. to 160° C.

These advantages are attainable using certain novel imide foams. The foams are prepared at higher temperatures than are ordinary imide foams of the same density and are characterized by a higher degree of conversion into a polyimide. The increased resistance to deformation by heat renders laminates prepared therefrom suitable for use at higher temperatures. However, beyond that, the foams permit higher temperatures to be used in the preparation of laminates therefrom, so that in the manufacture of such laminates temperatures and pressures can be employed at which reinforcing layers having good thermal properties, for example fiber-reinforced synthetic resin layers of higher thermal resistance, can be used or prepared in situ. Such reinforcing synthetic resin layers are obtained, for example, by hardening duroplast resins. As a result of the higher stiffness of such fiber-reinforced synthetic resins at high temperatures, or because of the use of other strong reinforcing layers—such as of metal—, forces applied to the laminate are transferred over a larger region of the foam layer, whereby the strength properties, for example the resistance to bending of the laminate, can additionally be improved at high temperatures.

Foams having an increased number of imide groups and increased resistance to deformation by heat are obtainable in the following ways, respectively described in copending U.S. patent applications Ser. No. 912,962 filed June 6, 1978 and Ser. No. 911,283 filed May 31, 1978 (now U.S. Pat. No. 4,139,685 granted Feb. 13, 1979) both incorporated herein by reference:

I. By the free radical polymerization of a mixture of
   (a) 20–99.99% by weight of acrylic acid and/or methacrylic acid,
   (b) 0.01–5% by weight of a metal salt of acrylic acid or methacrylic acid,
   (c) 0–79.99% by weight of further ethylenically unsaturated monomers co-polymerizable therewith,
   (d) a blowing agent compatible with the polymer and present in an amount sufficient for the formation of a foam, and
   (e) a free radical initiator,
a polymer is obtained which, on heating at 170°–200° C., preferably at 190°–220° C., is converted into a foam; or II. By the free radical polymerization of a mixture of
   (a) acrylonitrile and/or methacrylonitrile with acrylic acid and/or methacrylic acid in a mole ratio from 2:3 to 3:2,
   (b) 0–20% by weight (of component a) of other free-radically polymerizable monomers,
   (c) 1–15% by weight of the sum of (a) and (b) of a monovalent aliphatic alcohol having 3–8 carbon atoms in the molecule as a blowing agent, and
   (d) a free radical-forming initiator,
a polymer is obtained which on subsequent heating at 170° C.–250° C., preferably 190° C.–220° C., is converted into a foam.

According to a preferred embodiment, foams obtained by combinations of the aforementioned preparatory methods are employed for the preparation of laminates. Thus, preferably, in process I, a blowing agent containing a monovalent aliphatic alcohol is used. Secondary and tertiary aliphatic alcohols, particularly tert.-butyl alcohol, are particularly advantageous. Also, as comonomer (c), acrylonitrile and/or methacrylonitrile are preferred, particularly in a mole ratio between 2:3 and 3:2 to the acrylic acid and/or methacrylic acid. As taught in application Ser. No. 912,962, if the nitrogen content of the polymer is not sufficient for imide formation to the desired degree, then foaming agents having an amide structure and which cleave ammonia on heating are employed exclusively or predominantly.

The metal salt used in the preparation of the imide foam is preferably chosen from the acrylic acid salts and methacrylic acid salts of $Mg^{2+}$, $Zr^{4+}$, $Cr^{3+}$, $Co^{2+}$, $Zn^{2+}$, $Cd^{2+}$, $Bi^{3+}$, $TiO^{2+}$, and $Pb^{2+}$ and is present in an amount from 0.01–5% by weight, calculated on the total weight of the polymerizable monomers.

The blowing agents first mentioned herein for the preparation of imide foams, e.g., formamide, monomethyl formamide, urea, or dimethyl urea, can be used in the preparation of the foam. However, the already-mentioned aliphatic alcohols having 3–8 carbon atoms permit the achievement of clearly improved foam properties. The blowing agent is, as a rule, used in an amount of from 1-10% by weight. An addition of 0.1-3% of water (calculated on the total weight of the mixture) proves advantageous in many cases, since a coarser pore structure and a better bonding with the synthetic resin used as the reinforcing layer or used to adhere the reinforcing layer can be achieved.

The preparation of the foamable polymer takes place in a manner known per se by polymerization in bulk, wherein the mixture of monomers, blowing agents, the optionally-employed metal salts, and a free radical initiator is permitted to polymerize at temperatures of, for example, 40° C.-120° C. As the free radical initiators, dibenzoyl peroxide, tert.-butyl perpivalate, or azo-bis-isobutyronitrile are suitable, for example. The liquid mixture is suitably polymerized in a layer from 1 to 3 cm. thick, for example in a polymerization chamber formed between two glass plates and an elastic filiform sealing gasket arranged between the edges thereof. The resulting polymer sheets can be expanded by heating to form slabs. At foaming temperatures of 170°-250° C., foams having a density from 30 to 600 kg/m$^3$ can be prepared, the density being lower, the higher is the foaming temperature. The preferred foaming temperatures are in the range from 190°-220° C. In this manner, the preferred foams having densities of 50-200 kg/m$^3$ are obtained. The foaming process is concluded, as a rule, after one or two hours.

For the preparations of laminates according to the present invention, the foams prepared by heating to 170°-220° C. are suitably cut into planar slabs which are, for example, 5-50 mm thick and are coated on at least one side, preferably on both sides, with a reinforcing layer.

The reinforcing layer (or layers) can be formed in situ as a fiber-reinforced layer of synthetic resin or it can be pre-formed and adhered to the foam with such a resin. Particularly advantageous pre-formed layers are those made from a fiber-reinforced synthetic resin like those that can be used for in situ formation of the reinforcing layer, or they are of metal, preferably aluminum or an alloy in which aluminum is predominantly present.

Since pre-formed fiber-reinforced reinforcing layers are formed just as are those layers which are formed in situ on the foam layer, and since pre-formed layers—whether of metal or resin—are adhered to a foam layer with a resin under the same conditions of temperature, time, and pressure as are used to form in situ reinforcing layers of a resin, a description of the in situ formation of a fiber-reinforced reinforcing layer will suffice to describe also the adhesion of pre-formed layers to a foam layer.

The reinforcing layer as a rule is a flat layer which is 0.5-5 mm. thick. If it is of resin, it preferably contains mineral fibers, particularly glass fibers, or, for laminates subjected to high stresses, also graphite fibers, as the reinforcing fibers. However, synthetic fibers of polyamide or polyester, as well as combinations of different types of fibers, are also employed. A detailed description of suitable fibers is to be found in P. H. Selden, "Glasfaserverstaerkte Kunststoffe", Springer Verlag, Berlin, (1967) on pages 159-289. The fibers can be uniformly distributed in the synthetic resin. Preferably, they form strands, fabrics, or felts. A principal amount of the fiber can be arranged in a preferred direction for the acceptance of higher stresses. The fiber portion is in general between 20 and 80% by weight of the total weight of the fiber-reinforced resin. The lower region from 20-50% by weight is for general technical uses and the upper region from 50-80% by weight is considered preferred for aircraft construction.

For the remainder, the fiber-reinforced layer comprises a hardened synthetic resin. The synthetic resins suitable for this purpose (or to adhere pre-formed layers) are known to those skilled in the art and are extensively discussed in the aforementioned book of P. H. Selden (pages 5-82). Unsaturated polyester resins and hardenable epoxy resins are predominantly used. Phenol resins and aminoplast resins are also used. If these resins are employed in liquid form, those known lamination techniques are employed according to which the liquid resin and a cloth or non-woven fabric felt of the fiber material is applied to the foam to the desired thickness and hardened. Duroplast resins in the form of so-called "prepregs" are used to particular advantage. By this term are meant, according to D.I.N. 61850, resins in the form of sheets having fibers therein, optionally in the form of strands, fabrics, or felts. The duroplast resins contained therein are, at room temperature, highly viscous, pasty or solid, and harden at higher temperature without further additives. After hardening, they give synthetic resins having a particularly high resistance to deformation by heat which corresponds roughly with that of the foam. In this way, the high-strength properties of both materials can be fully utilized also in the region of high usage temperatures. For the hardening of prepregs either high temperatures and high pressures with short compression time, or high temperatures and long compression times at low pressure, or long compression times, higher pressure, and moderate temperatures are necessary. Conventional imide foams cannot be subjected to these stresses: either, the foam will shrink under the heat and pressure applied, or, when the pressure is decreased, the laminate buckles.

Typical hardening conditions under which laminates according to the present invention can be prepared are given in the following Table, in which "UP" means "unsaturated polyester".

TABLE I

| Polymethacrylimide Foam Density (kg/m$^3$) | Prepreg Resin Type | Hardening Temperature (°C.) | Press Time (Minutes) | Pressure (N/mm$^2$) |
|---|---|---|---|---|
| 95 | UP | 145 | 3 | 1.5 |
| 110 | Epoxide | 120 | 60 | 1.5 |
| 110 | Epoxide | 125 | 30 | 0.3 |
|  |  | 175 | 60 | 0.3 |

As a rule, a temperature of 140° C., and/or a hardening time of 30 minutes, and/or a pressure of 1 N/mm$^2$ are used or exceeded for hardening a layer of fiber-reinforced synthetic resin or for adhering a pre-formed reinforcing layer to the foam with such a resin. Under these conditions, prepregs are plastic to such an extent that the duroplast resin is distributed in a heated press into a uniform layer or accommodates itself to the form of the pressing tool employed. The resulting shaped part can be taken hot out of the press or the tool without buckling. In this way, significantly shorter press times are possible than when the press must be cooled off before removal of the shaped piece. This is necessary with ordinary imide foams since they expand if the press is opened at elevated temperatures.

Under the hardening conditions shown in Table I, conventional polyimide foams of comparable density would shrink by more than 10 percent. Conventional foams like those shown in U.S. Pat. No. 3,627,711 would even shrink by more than 20 percent.

A better understanding of the present invention and its many advantages will be had by referring to the following specific examples given by way of illustration.

A. Preparation of Imide Foams

EXAMPLE 1

A mixture of 1300 ml of methacrylic acid, 1300 ml of methacrylonitrile, 65 g of chromium-III-dimethacrylate-hydroxide, 208 ml of tert.-butanol, and 52 ml of water was combined with 0.1% by weight of tert.-butyl-perpivalate and 0.05% by weight of dibenzoyl peroxide and then polymerized in a glass chamber at a layer thickness of 1 cm at 45° C. for 48 hours.

Subsequently, the material was post-polymerized for two hours at 50°–100° C. and for two hours at 100° C. The material was foamed for two hours at 220° C.

Density: 134 kg/m$^3$.
Compression resistance: 5.0 N/mm$^2$.
Resistance to deformation by heat: 246° C.
Water uptake: 16.6% by weight after seven days (in distilled H$_2$O at 23° C.)

For comparison, values are given below for a commercially-available polymer (formed with formamide at 175°–180° C.), Density: 130 kg/m$^3$.
Compression resistance: 3.8–4.1 N/mm$^2$.
Resistance to deformation by heat: 185° C.
Water uptake: 43% by weight after seven days.

EXAMPLES 2–5

Chromium-dimethacrylate-hydroxide in amounts from 0.001 to 0.01 mole was added to 100 ml portions of a monomer mixture of 28 parts by weight of methacrylonitrile, 65 parts by weight of methacrylic acid having a content of 8 parts by weight of formamide, 0.1 part by weight of tert.-butyl perpivalate, and 0.05 part by weight of dibenzoyl peroxide. The material was polymerized at 42° C. in glass chambers 10×10×1 cm in size. After post-polymerization for two hours at 100° C., the samples were foamed for two hours at 190° C. or for two hours at 220° C.

TABLE II

| Example No. | Chromium Content (Mole/100 ml) | Density After Foaming at 190° C. (g/l) | Density After Foaming at 220° C. (g/l) |
|---|---|---|---|
| 2 | 0.001 | 80 | 40 |
| 3 | 0.002 | 90 | 50 |
| 4 | 0.005 | 100 | 60 |
| 5 | 0.01 | 115 | 70 |

EXAMPLES 6–17

100 ml of an equimolar mixture of methacrylic acid and methacrylonitrile were combined with 10 ml of blowing agent (see Table III). These solutions were in each case combined with 0.003–0.01 mole of the corresponding metal salt (see Table III). After the addition of 0.1% by weight of tert.-butyl perpivalate and 0.05% by weight of dibenzoyl peroxide, the mixture was polymerized at 50° C. in a glass chamber 10×10×1 cm in size. After 24 hours, the material was post-polymerized for one hour at 60° C.–100° C. and for one hour at 100° C. The polymers were foamed for two hours at 200° C. or two hours at 220° C.

TABLE III

| Example No. | Metal Salt Cation | Metal Salt Anion | Concentration (Mol/100 ml) | Blowing Agent | Foam Density Formed At 200° C. (kg/m$^3$) | Foam Density Formed At 220° C. (kg/m$^3$) |
|---|---|---|---|---|---|---|
| 6 | NONE | | — | 8 ml t.But.$^3$ +2 ml H$_2$O | 85 | 36 |
| 7 | Mg$^{2+}$ | meth$^1$ | 0.01 | 8 ml t.But.$^3$ +2 ml H$_2$O | — | 60 |
| 8 | K$^+$ | meth | 0.01 | 8 ml t.But.$^3$ +2 ml H$_2$O | 200 | 47 |
| 9 | TiO$^{2+}$ | acac$^2$ | 0.009 | 8 ml t.But.$^3$ +2 ml H$_2$O | 260 | 100 |
| 10 | Cr$^{3+}$ | meth | 0.01 | 8 ml t.But.$^3$ +2 ml H$_2$O | 250 | 97 |
| 11 | Co$^{2+}$ | acetate | 0.01 | 8 ml t.But.$^3$ +2 ml H$_2$O | — | 38 |
| 12 | Zn$^{2+}$ | meth | 0.01 | 8 ml t.But.$^3$ +2 ml H$_2$O | — | 55 |
| 13 | Zr$^{4+}$ | acac | 0.01 | 8 ml t.But.$^3$ +2 ml H$_2$O | 170 | 67 |
| 14 | Cd$^{2+}$ | meth | 0.01 | 8 ml t.But.$^3$ +2 ml H$_2$O | 155 | 47 |
| 15 | Bi$^{3+}$ | acetate | 0.0013 | 8 ml t.But.$^3$ +2 ml H$_2$O | — | 45 |
| 16 | Pb$^{2+}$ | acetate | 0.01 | Propanol-2 | 170 | 25 |
| 17 | Al$^{3+}$ | acac | 0.008 | " | — | 110 |

$^1$meth = methacrylate
$^2$acac = acetylacetonate
$^3$t.But. = tert.-Butyl alcohol

EXAMPLES 18–21

0.05 part by weight of dibenzoyl peroxide and 0.135 part by weight of tert.-butyl perpivalate were dissolved in 100 parts by weight of a mixture of 45 parts by weight of methacrylonitrile and 55 parts by weight of methacrylic acid (mole ratio=1.05:1). The blowing agents shown in Table IV were added to the solution. The mixtures were put into glass chambers 10×10×1 cm in size and polymerized at 52° C. After 24 hours they were post-polymerized for one hour at 60°–100° C. and for one hour at 100° C. The polymer blocks obtained were foamed for two hours at 220° C.

TABLE IV

| Example No. | Blowing Agent (Parts by Weight) | | Foam Density (kg/m³) |
| --- | --- | --- | --- |
| 18 | 8 | Butanol-1 | 100 |
| 19 | 8 | Pentanol-3 | 120 |
| 20 | 8 | Hexanol-1 | 360 |
| 21 | 8 | 2-Ethyl-Hexanol | 100 |
|  | 2 | Water |  |

EXAMPLE 22

84.4 parts by volume of methacrylic acid were mixed with 66.3 parts by volume of acrylonitrile (mole ratio=1:1). 50 parts by volume of this mixture were combined with four parts by volume of tert.-butyl alcohol, one part by volume of water, 0.1 part by weight of tert.-butyl perpivalate, and 0.05 part by weight of dibenzoyl peroxide and then polymerized in a layer 2 cm thick between glass plates for 48 hours at 45° C., for one hour at 60°–100° C., and for one hour at 100° C. The sheet obtained was expanded during 30 minutes at 220° C. to form a fine-pored foam slab.

B. Preparation of Laminates

EXAMPLE 23

An 8 mm thick plate of the hard foam prepared according to Example 1, 300×200 mm in size, is brought into contact on its surfaces with glass fiber-reinforced pieces of a prepreg comprising an unsaturated polyester resin (commercially available from Menzolite, Type SPP 30 R) and put into a two-part steel pressing tool having a surface temperature of 145° C. The tool is closed with the aid of an hydraulic press. The specific compression pressure is p=1.5 N/mm². After three minutes the press is opened. The shaped piece, now surrounded with glass fiber-reinforced synthetic resin, is removed hot and cooled to room temperature. The shaped piece is not warped, is free of bulges, and is of a thickness which corresponds to the cavity of the tool.

EXAMPLE 24

A tablet of the foam prepared according to Example 1, 8 mm thick and 300×300 mm in size, is coated on both sides with a glass fiber-containing epoxy resin prepreg ("Fibredux 916 G", Ciba-Geigy) and then is pressed between heated pressure plates at a temperature of 120° C. with a specific pressure of p=1.5 N/mm². After a hardening time of one hour, the bonded core is removed hot. The material had not experienced any compression.

EXAMPLE 25

A foam plate of the dimensions 120×120×8 mm is coated on both sides with a high-temperature resistant glass fiber-containing epoxy resins prepreg ("Fibredux 918 G", Ciba-Geigy). The material is hardened for 30 minutes at 125° C. and for 60 minutes at 175° C. between hot pressure plates under a pressure of 0.3 N/mm². The laminate is removed hot from the press and cooled to room temperature.

All of the foams prepared according to Examples 1–22 can be made into laminates according to the invention using this process. In no case is the foam compressed. After removal of the compression pressure, the laminates are flat and of uniform thickness. They can withstand continuous loading at temperatures of 120°–160° C.

EXAMPLE 26

A sheet of hard foam, 300×300 mm in size and 8 mm thick, having a density of 115 g/l and prepared according to Example 5, was adhered on both sides to aluminum sheets 2 mm in thickness. As the adhesive, a modified epoxy resin adhesive film was employed ("Redux 322", commercially available from Ciba-Geigy AG). This adhesive film was applied in each case between the aluminum sheet and the hard foam sheet. The hardening time was one hour at a temperature of 175° C. under a compressive pressure of 0.3 N/mm². The laminate was taken hot from the press and cooled to room temperature. The hard foam sheet experienced no compression during the hardening process. Also, no bulges were discoverable.

EXAMPLE 27

A hard foam sheet of the dimensions 300×300×8 mm and having a density of 90 g/l, prepared according to Example 3, is coated on both sides with a laminating resin of the following formulation:

Epoxy resin "LY 556", hardener "HT 972"; mixing ratio of resin: hardener=100:27 in parts by weight ("Araldit", commercially available from Ciba-Geigy AG).

A high temperature-resistant epoxy resin sheet containing glass fibers is now applied on both sides of the foam layer. The epoxy resin sheet containing glass fibers was prepared by hardening an epoxy resin prepreg ("Fibredux 918 G", commercially available from Ciba-Geigy AG). The laminate was hardened for three hours at 140° C. at a compressive pressure of 0.1 N/mm². After cooling in the press, the piece was removed and it was determined that the hard foam sheet had not suffered any compression.

What is claimed is:

1. A laminate comprising at least one polyimide foam layer and at least one reinforcing layer bonded thereto, said polyimide foam layer being prepared by foaming an unfoamed polymer containing a blowing agent compatible with said polymer and present therein in an amount sufficient to foam the polymer on heating the polymer at a temperature from 170° C. to 250° C., said unfoamed polymer being obtained by free-radically polymerizing a member selected from the group consisting of (I) a mixture of
  (a) 20–99.99 percent by weight of acrylic acid or methacrylic acid,
  (b) 0.01–5 percent by weight of a metal salt of acrylic acid or methacrylic acid,
  (c) 0–79.99 percent by weight of a further ethylenically unsaturated comonomer copolymerizable with (a) and (b), and
  (d) a blowing agent comprising a compound having an amide structure which cleaves ammonia on heating, and (II) a mixture of
  (a) acrylonitrile or methacrylonitrile with acrylic acid or methacrylic acid in a mole ratio from 2:3 to 3:2,
  (b) 0–20 percent by weight of (a) of a further ethylenically unsaturated comonomer copolymerizable therewith, and (c) 1–15 percent by weight of the sum of (a) and (b) of a monovalent aliphatic alcohol having 3–8 carbon atoms as said blowing agent.

2. A laminate as in claim 1 wherein said reinforcing layer is a fiber-reinforced layer of a synthetic resin.

3. A laminate as in claim 2 wherein said reinforcing layer comprises from 20–80 percent by weight of fibers and from 80–20 percent by weight of a hardened duroplast resin.

4. A laminate as in claim 1 wherein said synthetic resin is a polyester resin or an epoxy resin.

5. A laminate as in claim 1 which comprises a core layer of polyimide foam and two cover layers, one on either side thereof, of fiber-reinforced synthetic resin.

6. A laminate as in claim 5 wherein said foam layer is flat and from 5 to 50 mm thick and said cover layers are flat and from 0.5 to 5 mm thick.

7. A laminate as in claim 1 wherein said reinforcing layer is of metal.

8. A laminate as in claim 7 wherein said metal is aluminum or an alloy predominantly containing aluminum.

9. The method of making a laminate which comprises pressure bonding at least one reinforcing layer to at least one polyimide foam layer with a heat-hardenable duroplast resin at a temperature of at least 100° C. and under such limitation on temperature, pressure, and time that at least two of the following three conditions are met:
   (i) the hardening temperature is at least 140° C.,
   (ii) the compressive pressure is at least 1.0 N/mm$^2$,
   (iii) the hardening time is at least 30 minutes,
said polyimide foam layer being prepared by foaming an unfoamed polymer containing a blowing agent compatible with said polymer and present therein in an amount sufficient to foam the polymer on heating the polymer at a temperature from 170° C. to 250° C., said unfoamed polymer being obtained by free-radically polymerizing a member selected from the group consisting of
   (I) a mixture of
      (a) 20–99.99 percent by weight of acrylic acid or methacrylic acid,
      (b) 0.01–5 percent by weight of a metal salt of acrylic acid or methacrylic acid,
      (c) 0–79.99 percent by weight of a further ethylenically unsaturated comonomer copolymerizable with (a) and (b), and
      (d) a blowing agent comprising a compound having an amide structure which cleaves ammonia on heating, and
   (II) a mixture of
      (a) acrylonitrile or methacrylonitrile with acrylic acid or methacrylic acid in a mole ratio from 2:3 to 3:2,
      (b) 0–20 percent by weight of (a) of a further ethylenically unsaturated comonomer copolymerizable therewith, and
      (c) 1–15 percent by weight of the sum of (a) and (b) of a monovalent aliphatic alcohol having 3–8 carbon atoms as said blowing agent.

10. A method as in claim 9 wherein said heat-hardenable duroplast resin is an unsaturated polyester resin or a hardenable epoxy resin.

11. A method as in claim 9 wherein said reinforcing layer is a fiber-reinforced layer of heat-hardenable duroplast resin.

12. A method as in claim 11 wherein said fiber-reinforced layer of heat-hardenable duroplast resin is bonded to said polyimide foam layer in the form of a prepreg.

13. A method as in claim 9 wherein said reinforcing layer is of metal.

14. A method as in claim 13 wherein said metal is aluminum or an alloy predominantly containing aluminum.

* * * * *